US012777328B2

(12) United States Patent
Gokturk et al.

(10) Patent No.: US 12,777,328 B2
(45) Date of Patent: Oct. 27, 2026

(54) SECURITY MODE AWARE CLIENT CONNECTION MANAGEMENT

(71) Applicant: AIRTIES S.A.S., Paris (FR)

(72) Inventors: Muharrem Sarper Gokturk, Istanbul (TR); Metin Ismail Taskin, Istanbul (TR)

(73) Assignee: AIRTIES S.A.S., Paris (FR)

( * ) Notice: Subject to any disclaimer, the term of this patent is extended or adjusted under 35 U.S.C. 154(b) by 2 days.

(21) Appl. No.: 18/717,279

(22) PCT Filed: Dec. 9, 2022

(86) PCT No.: PCT/IB2022/062010
§ 371 (c)(1),
(2) Date: Jun. 6, 2024

(87) PCT Pub. No.: WO2023/105488
PCT Pub. Date: Jun. 15, 2023

(65) Prior Publication Data

US 2025/0048087 A1 Feb. 6, 2025

Related U.S. Application Data

(60) Provisional application No. 63/287,742, filed on Dec. 9, 2021.

(51) Int. Cl.
*H04W 12/00* (2021.01)
*H04W 8/22* (2009.01)
*H04W 12/73* (2021.01)

(52) U.S. Cl.
CPC ......... *H04W 12/009* (2019.01); *H04W 12/73* (2021.01); *H04W 8/22* (2013.01)

(58) Field of Classification Search
CPC ............................ H04W 12/009; H04W 12/73
See application file for complete search history.

(56) References Cited

U.S. PATENT DOCUMENTS 10,009,815 B2 * 6/2018 Masini ................ H04L 61/4511
10,270,651 B2 * 4/2019 Kumar ................ H04L 41/0806
10,506,438 B2 * 12/2019 Yilmaz ............... H04W 60/005
11,166,226 B2 * 11/2021 McCann ............... H04W 48/16
(Continued)

FOREIGN PATENT DOCUMENTS

EP 2947909 A1 11/2015

OTHER PUBLICATIONS

Surroca Silvia et al.: "Addressing the eduroam inter-domain mobility problem through virtual APs", 2017 13th International Wireless Communications and Mobile Computing Conference (IWCMC), IEEE, Jun. 26, 2017 (Jun. 26, 2017), pp. 109-114, XP033125232, DOI: 10.1109/IWCMC.

*Primary Examiner* — Viral S Lakhia
(74) *Attorney, Agent, or Firm* — Volpe Koenig

(57) ABSTRACT

Generally, disclosed herein is a method, system, and/or apparatus for managing a connection of a wireless device based on a security mode supported by the device and the security modes supported by the network of the wireless device. In the network, there may be one or more access points that run a client connection management daemon/program. The program may steer the device to an interface of an AP that meets one or more security modes configured preferences.

10 Claims, 12 Drawing Sheets

(56) References Cited

U.S. PATENT DOCUMENTS

| | | | | |
|---|---|---|---|---|
| 11,677,642 | B2 * | 6/2023 | O'Flaherty | H04L 41/16 709/206 |
| 11,728,904 | B2 * | 8/2023 | Hara | H04B 10/85 398/115 |
| 12,170,648 | B2 * | 12/2024 | Fuss | H04L 63/0236 |
| 12,185,221 | B2 * | 12/2024 | Abeysekera | H04W 24/02 |
| 2007/0081477 | A1 * | 4/2007 | Jakkahalli | H04W 12/08 370/310 |
| 2015/0188949 | A1 * | 7/2015 | Mahaffey | H04W 12/37 726/1 |
| 2016/0302122 | A1 * | 10/2016 | Masini | H04W 24/10 |
| 2017/0013482 | A1 * | 1/2017 | Tandai | H04L 5/0048 |
| 2017/0289898 | A1 * | 10/2017 | Youn | H04W 76/16 |
| 2022/0109996 | A1 * | 4/2022 | Lee | H04W 12/50 |
| 2022/0330136 | A1 * | 10/2022 | Siraj | H04W 48/12 |
| 2022/0338141 | A1 * | 10/2022 | Singh | H04W 56/003 |
| 2023/0152471 | A1 * | 5/2023 | Nekoui | G01S 19/396 342/357.64 |
| 2023/0154248 | A1 * | 5/2023 | Das | G01S 7/003 701/31.4 |

* cited by examiner

SECURITY MODE AWARE CLIENT CONNECTION MANAGEMENT

CROSS REFERENCE TO RELATED APPLICATIONS

This application claims the benefit of U.S. provisional application U.S. 63/287,742 filed Dec. 9, 2021, which is incorporated by reference as if fully set forth.

BACKGROUND

In the field of wireless communication, there may be more than one user device in a wireless network (e.g., Wi-Fi), where each user device uses a different security mode. In such a scenario, there is a need to address problems that may arise related to the different security modes and the management of the user devices in the wireless network.

SUMMARY

Generally, disclosed herein is a method, system, and/or apparatus for managing a connection of a wireless device based on a security mode supported by the device and the security modes supported by the network of the wireless device. In the network, there may be one or more access points that run a client connection management daemon/program. The program may steer the device to an interface of an AP that meets one or more security modes configured preferences.

BRIEF DESCRIPTION OF THE DRAWINGS

The following figures illustrate one or more techniques described herein.

DETAILED DESCRIPTION

Figure 1:
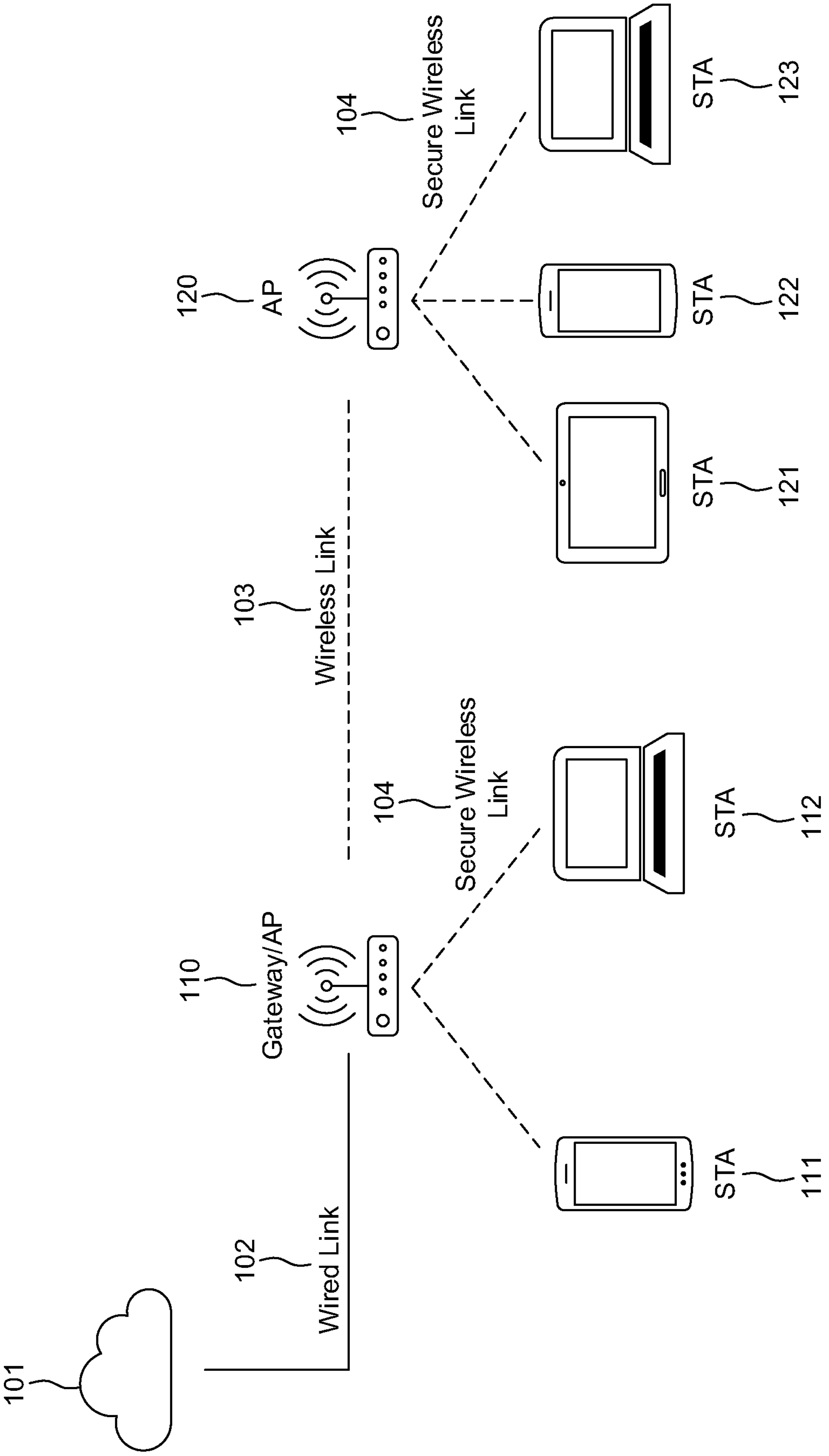
FIG. 1 illustrates an example of a wireless network architecture.

Generally, a user may need to move around while operating a device, in which case it may be beneficial for the user to use a wireless device that operates in a wireless network as opposed to a wired device. The wireless device may be a user device, also referred to herein as a client. The user device may be a station (STA), a laptop, a smartphone, a tablet, a computer, an IoT device, a wearable (e.g., watch, VR headset, etc.), or any other device capable of providing a user with data and/or accepting data from a user, as well as operating on the wireless network. As described herein, the term STA may be used for demonstration purposes herein and may be interchangeable with any of the aforementioned devices. A STA may have one or more of the following elements: a processor (e.g., CPU, GPU, etc.), a memory (e.g., RAM, ROM, etc.), a storage medium (e.g., HD, SSD, SD, etc.) an application (e.g., stored on the storage medium and executed by the processor), firmware, wired communications ports (e.g., Ethernet, etc.), wireless communications (e.g., wireless driver, a transceiver radio that may include one or more transmitters and receivers, an antenna or antenna panel coupled to the transceiver, an 802.11 Wi-Fi antenna/chip, a Bluetooth radio antenna/chip, etc.), a keyboard or the like, a display or the like, input/output ports, and/or sensors (e.g., GPS or the like, accelerometer, etc.). All elements of a STA (software and/or hardware) may be operatively connected (e.g., directly or indirectly).

A STA may be identifiable, using unique identifiers, MAC addresses, Organizationally Unique Identifiers (OUIs), or phone number, or some other means of identification.

The wireless network may be local (e.g., a local area network, or wireless local area network (WLAN), etc.) and serve an area determined by the range of its constituent parts (e.g., APs). The wireless network may comprise one or more components (which are interchangeable as described herein for demonstration purposes, unless otherwise distinguished), such as one or more APs, gateways, routers, controllers, and/or other network nodes. Each of these devices may be directly or indirectly connected to one another. In some cases, one or more of these devices may be combined into a single physical unit (e.g., where one or more components are virtualized, such as a gateway/AP unit, or a gateway/router/AP unit, etc.). An AP (e.g., any network node) may have one or more of the following: a processor (e.g., CPU, GPU, etc.), a memory (e.g., RAM, ROM, etc.), a storage medium (e.g., HD, SSD, SD, etc.) an application (e.g., stored on the storage medium and executed by the processor), firmware, wired communications ports (e.g., Ethernet, etc.), wireless communications (e.g., baseband processor, wireless driver/kernel embedded in a wireless processor, a transceiver radio that may include one or more transmitters and receivers, an antenna or antenna panel coupled to the transceiver, an 802.11 Wi-Fi antenna/chip, a Bluetooth radio antenna/chip, etc.), a keyboard or the like, a display or the like, input/output ports, and/or sensors (e.g., GPS or the like, accelerometer, etc.). All elements (software and/or hardware) of an AP may be operatively connected (e.g., directly or indirectly). In one example, an AP may have a baseband processor (e.g., system on a chip) operatively connected to a processor, and the baseband processor may be configured to operate a plurality of basic service sets (BSSs).

A single physical device may have the AP, router, and Gateway functionalities. In other cases, a single physical device may have only one functionality (e.g., AP). As discussed herein, a device name may correspond to the supported functionalities, may also represent a primary functionality of a multi-function device. For example, in a wireless local area network context (WLAN), (i) reference to an AP device may mean a device that supports AP functionality, (ii) reference to a router device may mean a device that supports AP and router functionalities, and/or, reference to a Gateway device may mean a device that supports AP, router, and Gateway functionalities.

In some cases, a wireless network may comprise a Gateway and zero or more access points (APs) that are connected to the Gateway (e.g., if zero APs then the gateway has AP functionality). In some cases, a wireless network may be a mesh wireless network, and comprise at least two AP functionalities (e.g., two AP physical devices, one gateway/AP unit and an AP, etc.). Each STA in the wireless network may be connected to (e.g., associated with) an AP. The Gateway may act as the entry/exit for communication to and from the wireless network. All APs in a wireless network may be connected to the Gateway through backhaul links (e.g., directly or indirectly through other APs), which may be established using wired and/or wireless connections, such as Ethernet connection, 2.4 GHz, 5 GHz, 6 GHz Wi-Fi, MoCA (Multimedia over Coaxial Alliance), PLC (Power Line Communication), or the like. The one or more APs of the wireless network may be connected by wireless mesh links, or connected by wired links, or a combination of wireless mesh links and wired links. In one case, a wireless network may be formed by a set of interconnected APs called a wireless mesh network. The Gateway and the APs may form a wireless mesh network by using a wireless mesh technology, such as but not limited to, Wi-Fi Alliance EasyMesh™, IEEE 802.11s type mesh, and/or a proprietary wireless mesh technology.

All devices (e.g., STAs, APs, etc.) may support different protocols such as, but not limited to, IEEE 802.11n, IEEE 802.11ac, IEEE 802.11ax, and/or IEEE 802.11be (also may be named as Wi-Fi 4, Wi-Fi 5, Wi-Fi 6, Wi-Fi 7, respectively). Support for different versions of Wi-Fi also means that there may be some situations where a radio of a given device may support one or more spectrum (e.g., 2.4 GHz, 5 GHz, 6 GHz Wi-Fi). In some cases reference to a radio may mean support for one band, and in other cases reference to a radio may mean support for more than one band. All devices may also support one or more security modes for the encryption of wireless data communication. In some cases, the Wi-Fi version, and/or operating band, may be linked/required for/tied to a security mode. As used herein, a security mode is a suite of security protocols that may comprise of authentication methods, encryption methods, key derivation, and confirmation methods, and frame protection methods (e.g., robust management frame protection). For example, one or more security modes may include WEP (Wired Equivalent Privacy), Wi-Fi Protected Access (WPA), WPA2, WPA3, and/or the like (e.g., Wi-Fi Protected Access version N, and/or Security Mode N, where a higher level or new mode would be indicated as Security Mode N+1, N+2, etc.). As used herein, security mode may be interchangeable with security protocol, security support, security type, security requirement, and the like. For example, WPA3-Enterprise security mode may comprise one or more of the following security protocols: Authentication, such as multiple Extensible Authentication Protocol (EAP) methods; Authenticated encryption, such as minimum 128-bit Advanced Encryption Standard Counter Mode with Cipher Block Chaining Message Authentication (AES-CCMP 128); Key derivation and confirmation, such as minimum 256-bit Hashed Message Authentication Mode (HMAC) with Secure Hash Algorithm (HMAC-SHA256); and/or, Robust management frame protection, such as minimum 128-bit Broadcast/Multicast Integrity Protocol Cipher-based Message Authentication Code (BIP-CMAC-128). Note, a genericized naming scheme may be used herein for different security modes for illustration purposes, such as security mode A (SM-A), SM-B, etc., or SM-1, SM-2, etc., where each security mode may represent a different security mode. For one or more examples described herein, each security mode referenced for an example may correspond to WEP, WPA, WPA2, WPA3, etc., in implementation. These examples and generalizations are not intended to limit the disclosure to specific security protocols.

In one example, an AP may have a baseband processor operatively connected to a processor, and the baseband processor may be configured to operate a plurality of basic service sets (BSSs), where each BSS is associated with a first BSS identifier (BSSID) and an associated security mode.

In some instances, an AP may support different variations of a security mode, such as one that includes different Authentication Key Methods. For example, an AP may support WPA2-Personal mode, WPA2-Enterprise mode, WPA3-Personal Mode, and/or WPA3-Enterprise mode.

Figure 9:
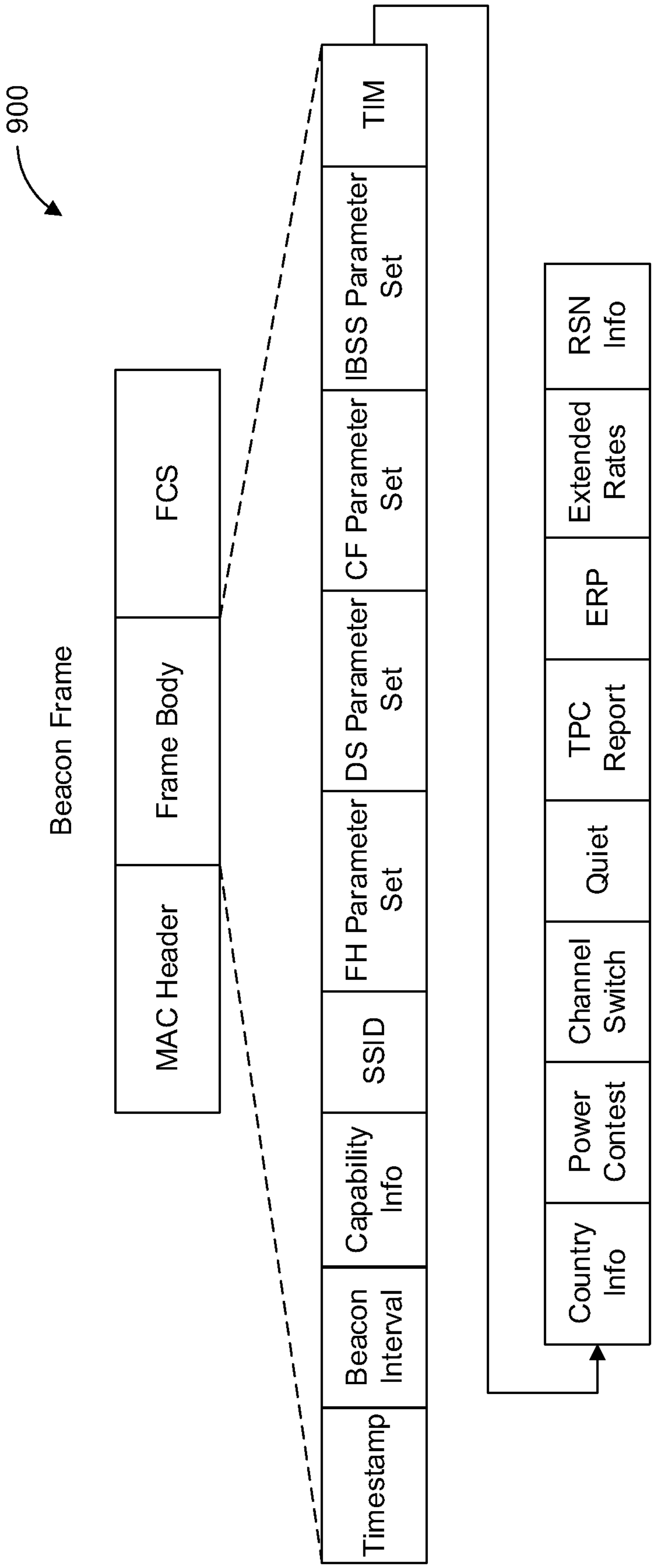
FIG. 9 illustrates an example of a beacon frame format.

A STA (e.g., wireless client) may learn about the capabilities of an AP through the AP's beacon frames or via the Probe Response frames (e.g., which are sent by the AP as a response to STA's Probe Request frame). FIG. 9 illustrates an example of a beacon frame format. The capabilities of the AP may include one or more supported security modes. A STA may connect wirelessly to an AP through one of the wireless interfaces of the AP using one or more of the indicated supported security modes (e.g., that the STA also supports). Generally, it is preferable that the highest security mode is used when possible (e.g., the newest security mode in most cases); such a preference may be configured. Each wireless interface of an AP may be identified by a Basic Service Set Identifier (BSSID), which may be a MAC address assigned to the wireless interface.

Wireless interfaces of an AP may also be identified as a Service Set Identifier (SSID), which may be assigned by the user (e.g., at an initial configuration of the wireless network or at the addition of an AP to a wireless network). Whereas SSID is an identifier assigned by the user to a BSSID, the BSSID is an identifier assigned automatically by the AP. A BSSID may be a globally unique or a locally administered MAC address, whereas an SSID may be a string that is chosen and assigned by a user/administrator of an AP (e.g., a string such as a noun or phrase making it easier to read). The same SSID may be used by different BSSIDs. Each wireless interface in a wireless network may have (e.g., at least locally) a unique BSSID, yet in some instances, all wireless interfaces may have the same SSID.

In one example, a STA may support the following security modes, WEP, WPA, WPA2-Personal, WPA3-Personal. Furthermore, an AP may support WEP, WPA, WPA2-Personal, WPA3-Personal security modes.

A wireless mesh network may have one or more SSIDs broadcast on one or more radios of the APs in the network. Each radio of an AP may have one or more interfaces each identified by a unique BSSID. Each interface (e.g., identified by a unique BSSID) may use one or more security modes among a set of available security modes to encrypt the wireless data communication carried on that interface. The security mode that is used may be selected/configured by the user/administrator of the network through a graphical user interface (GUI) of the AP (e.g., the GUI accessed through another device via the web, or in some cases, through an interface on the AP itself), through a GUI of an application that runs on a mobile device (e.g., such as but not limited to a smartphone or a table), and/or through a cloud application (e.g., accessible through the web, and that runs on a remote cloud-server managed by an Internet Service Provider (ISP)).

FIG. 1 illustrates an example of a wireless network architecture. As shown, there may be one Gateway/Access Point (AP) combined unit 110 and one AP 120 that is connected to the Gateway/AP through a wireless backhaul link 103. Each AP may serve one or more STAs. For example, STAs 111 and 112 may be associated with AP 110, and STA 121, 122, and 123 may be associated with AP 120. Each AP may have a secure link to each of their respective STAs. The Gateway 110 may have a connection to what may be generally referred to as the Internet 101, thereby providing access to other remote networks and/or devices. In some cases, there may be a client connection manager program that runs on the Gateway/AP 110 or on the AP 120, or may run on both (e.g., all APs of the network, 110 and 120). As discussed herein, an AP and a client connection manager may be interchangeable for purposes of discussing actions taken on the network side of a network-STA event (e.g., a STA wishes to connect to a network, meaning it would undergo an association procedure with an AP; or the network steers the STA, meaning a client connection manager running on the AP may make a determination that a steering action is required and perform the necessary functions to steer the STA to the preferred interface via the AP's radios; etc.). For example, a client connection manager may instruct a wireless driver of the AP to steer a STA to a different interface, as further discussed herein.

Each STA may be connected to a wireless interface of their associated AP in the wireless network. The connection between the STA and the network (e.g., through an AP/Gateway, etc.) may be secured using a security mode. Each STA in the network may use different wireless security modes. For example, a relatively old STA may use only one or more previously released security modes, such as WPA2, whereas a new STA may use a more recently released security mode, such as WPA3, in addition to previously released security modes (i.e., legacy security modes).

In some cases, there may be new and improved security modes developed and implemented as vulnerabilities and/or deficiencies of previous security modes are discovered. In one example security of Wi-Fi wireless networks (e.g., IEEE 802.11-based wireless networks), WEP (wired equivalent privacy), WPA (Wi-Fi Protected Access), WPA2 (WPA version 2), WPA3 (WPA version 3), and/or Security Mode N may be security modes (e.g., in order of older to newer) supported by a wireless network.

APs may support the use of one or more security modes to meet the requirements of a variety of wireless clients, where each wireless client may have a different security mode. As such, Gateways and APs may use one or more security modes, as described herein. For example, Gateways and APs may support all security modes that are used by different wireless clients.

There may be challenges associated with scenarios where an AP must support a variety of security modes, such as both old security modes and new security modes, at the same time. For example, in one use case, a STA may support both WPA2 and WPA3, and an AP may support both WPA2 and WPA3. As it relates to the security mode, it is generally best practice to use the newest security mode because it is more secure, and therefore in this example, the STA should prefer and use WPA3 over WPA2. In this use case, there are one or more approaches for the STA to select the newer (e.g., more secure) security mode: configure the STA to manage the security mode, have the user manage the security mode, and/or have the AP manage the security mode.

In the one approach, the STA may be (pre)configured to be "smart" such that it determines to use a configured preference (e.g., a higher security mode over a less secure security mode) automatically without requiring user intervention. This approach may have benefits, but challenges may still exist because every wireless client may have a different implementation resulting in different security selection rules. Furthermore, there will always be old devices in a network that may not have smart security selection features.

In the one approach, separate networks may be used for different security modes (e.g., use one SSID-password pair for one security mode, and use another distinct SSID-password pair for another security mode, and/or educate the user such that when he/she tries to connect his/her STA to the network, he/she selects the most secure SSID-password pair on par with his/her STA's best security mode). This approach may not be preferable because it requires user intervention at various stages, network setup, SSID-password selection, client connection management, etc. Connecting a wireless client to a network should be seamless and easy for the user, avoiding as much input from the user when appropriate.

In the one approach, an AP may be (pre)configured to be "smart" such that it determines the selection of, and use, a preferred security mode (e.g., the most secure security mode, a configured security mode, etc.) for each STA. This approach may have benefits as it relieves the user from dealing with network setup and security mode selection, and furthermore, it does not require any additional features on the STA side. Additionally, another benefit may be that currently deployed APs can be upgraded with new firmware to adapt these features, and thus all STAs in a network (e.g., without requiring any special feature or action from the STAs) can be connected to the optimal interface with respect to security mode.

As referenced herein, a preferred interface may be configured or preconfigured. Such configuration may be an indication to a device of a list of security modes in a preferred order (e.g., priority of use, if SM-C is available, use this security mode if possible baring any other rule or policy). In some cases, configuration information may include one or more other rules or policies. A client connection manager may need to determine an optimal security mode for a given use case weighed against the indicated preferred security mode(s). The client connection manager may also include other policies and/or rules when making this determination. In some cases, an indicated security mode preference (e.g., which security mode to use and/or is optimal) may be tied to another parameters, such as a radio type/band, interface, BSSID, SSID, operating condition, location, etc. As described herein, reference to a preferred, optimal, configured, and/or best security mode may be interchangeable.

Figure 2:
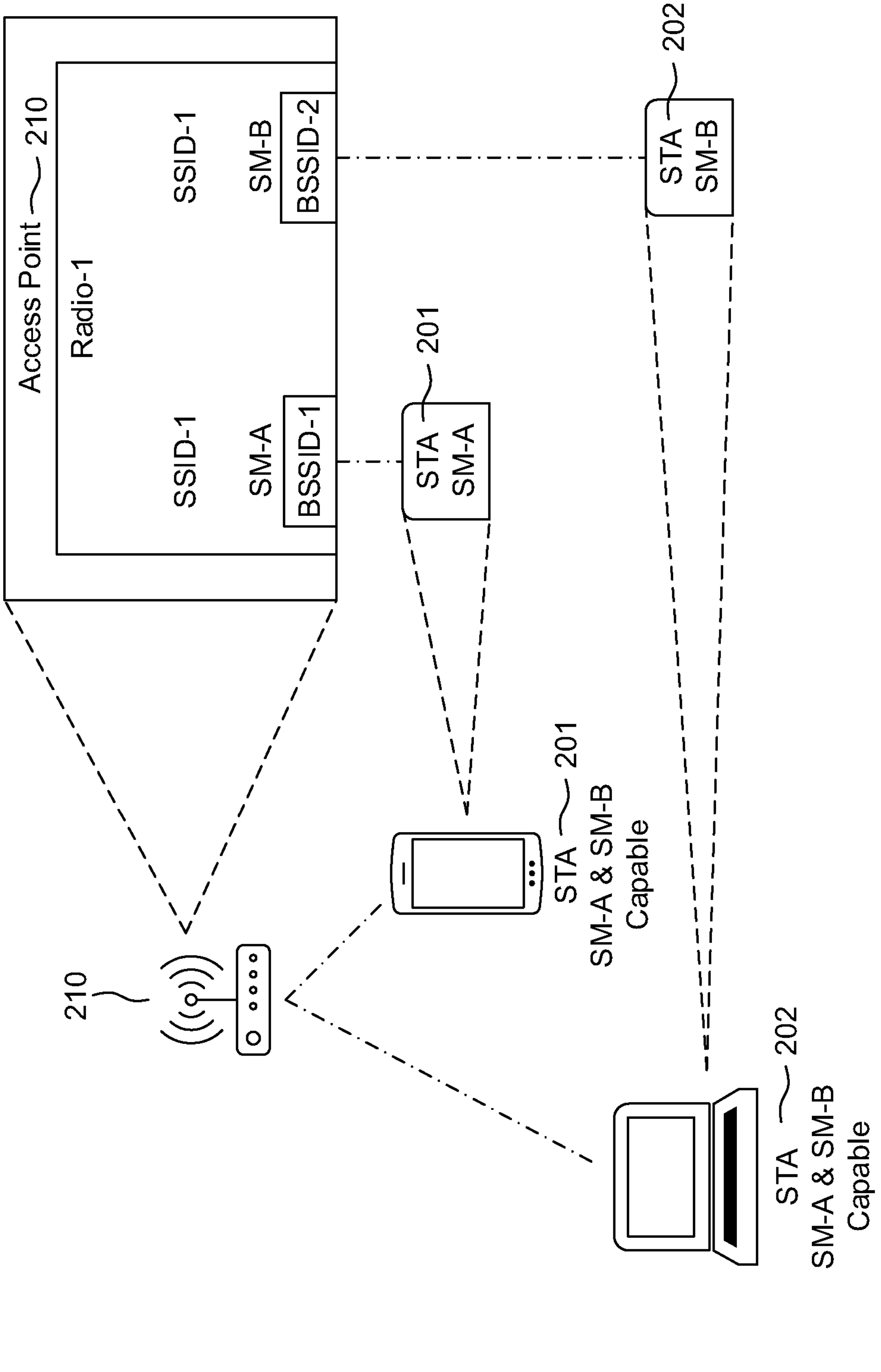
FIG. 2 illustrates an example scenario of an AP with one SSID and two BSSIDs using two security modes.

FIG. 2 illustrates an example scenario of an AP with one SSID and two BSSIDs using two security modes. In some cases, a STA may connect to an interface of an AP it has the network credentials of. The network credentials may include the SSID, password (key), and security mode (type).

As shown in FIG. 2, there may be an AP 210 that has one radio (Radio-1) with two different BSSIDs (BSSID-1 and BSSID-2), each BSSID using a different security mode (SM-A and SM-B), and broadcast under the same SSID-1. STA 201 may support security mode SM-A and/or SM-B, and may connect to BSSID-1, which uses the security mode SM-A. STA-202 may support security mode SM-B and/or SM-B, and may connect to BSSID-2, which uses security mode SM-B. Each security mode may have a password associated with it; as such, STA-201 has the password associated with BSSID-1's SM-A to establish a connection with BSSID-1. Likewise, STA-202 has the password associated with BSSID-2's SM-B to establish a connection with BSSID-2. The method that the STA acquires the password associated with a BSSID and the used security mode is out of the scope of this disclosure. Here, it is assumed that the STA already possesses the password to be able to establish a connection with a BSSID (e.g., it is preconfigured, entered by the user, and/or it is configured by the AP through a protocol).

Figure 3:
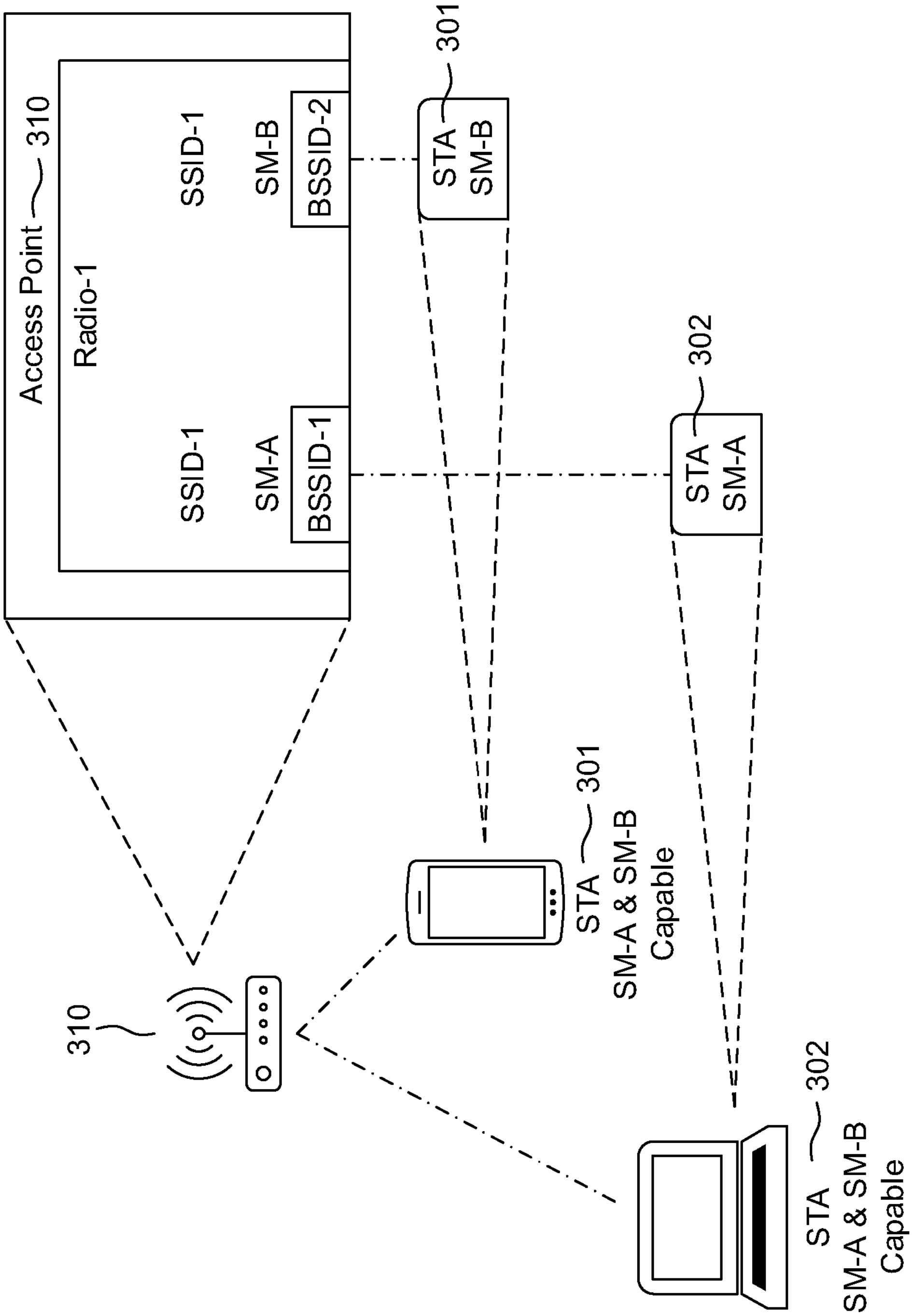
FIG. 3 illustrates an example scenario of an AP with one SSID and two BSSIDs using two security modes.

FIG. 3 illustrates an example scenario of an AP with one SSID and two BSSIDs using two security modes. Like FIG. 2, there may be an AP 310 that has one radio (Radio-1) with two different BSSIDs (BSSID-1 and BSSID-2), each BSSID using a different security mode (SM-A), and SM-B), and broadcast under the same SSID-1. STA 301 may support security mode SM-A and/or SM-B, and may connect to BSSID-1, which uses the security mode SM-A. STA-302 may support security mode SM-A and/or SM-B, and may connect to BSSID-2, which uses security mode SM-B. Each security mode may have a password associated with it; as such, STA-301 has the password associated with BSSID-1's SM-A to establish a connection with BSSID-1. Likewise, STA-302 has the password associated with BSSID-2's SM-B to establish a connection with BSSID-2. The method that the STA acquires the password associated with a BSSID and the used security mode is out of the scope of this disclosure. Here, it is assumed that the STA already possesses the password to be able to establish a connection with a BSSID (e.g., it is preconfigured, or it is configured by the AP).

Unlike the example of FIG. 2, in FIG. 3 STA-301 is connected to BSSID-2, which uses the security mode SM-B, and STA-302 is connected to BSSID-1, which uses the security mode SM-A.

In some cases, a station may not be configured with a preference for a particular security mode over other security modes. For example, considering the example cases in FIG. 2 and FIG. 3, STA-201/301 may not have any preference regarding which security mode to select. As such, STA-201/301 may connect to a BSSID without considering the security mode offered by the BSSID; as a result, the first STA 201/301 may connect to BSSID-1 with SM-A as shown in FIG. 2 or it may connect to BSSID-2 with SM-B as shown in FIG. 3, since all devices support the available security modes.

In some cases, a client connection manager running on an AP may evaluate the possible security mode alternatives fora given STA and may steer the STA to the interface/connection with the preferred/optimal security mode. In one instance, there may be one client connection manager that runs on one of the nodes of a wireless network—for example, on the Gateway. In another instance, each AP (e.g., including the Gateway) may run a client connection manager. When there is more than one client manager, in one instance they may operate independently of one another, or in another instance they may operate in concert/communication with one another.

Figure 4:
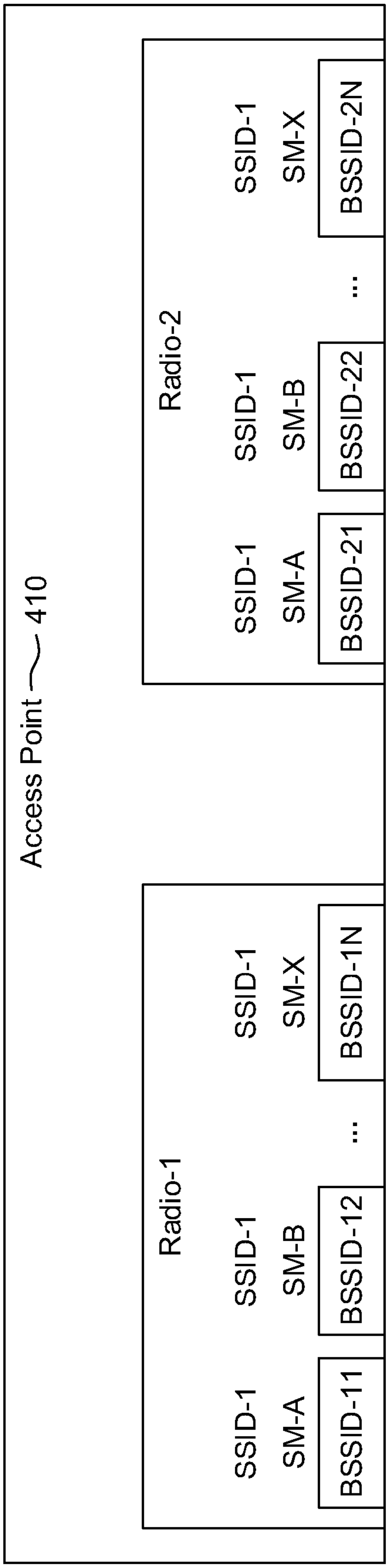
FIG. 4 illustrates an example of an AP with multiple radios, multiple security modes, and multiple BSSIDs.

FIG. 4 illustrates an example of an AP with multiple radios, multiple security modes, and multiple BSSIDs. In some cases, an AP may enable a wireless interface per security mode. For example, as shown, AP 410 may have separate wireless interfaces on each radio, such as BSSID-R1, BSSID-R2, . . . , BSSID-RN, where R represents the Radio (e.g., Radio-1 or Radio-2), so RN designates the radio ID. Each BSSID may have a different security mode, SM-A, SM-B, . . . , SM-X, respectively. Each interface may have the same SSID, such as SSID-1. In one instance, the password (e.g., security key) for each wireless interface may be the same. In an example, a STA that uses SM-A may connect to a BSSID that uses SM-A, such as BSSID-11 (Radio-1 and the first BSSID of Radio-1) or to BSSID-21 (Radio-2 and the first BSSID of Radio-2); for either connection option, the SSID may be the same (e.g., SSID-1).

Figure 5:
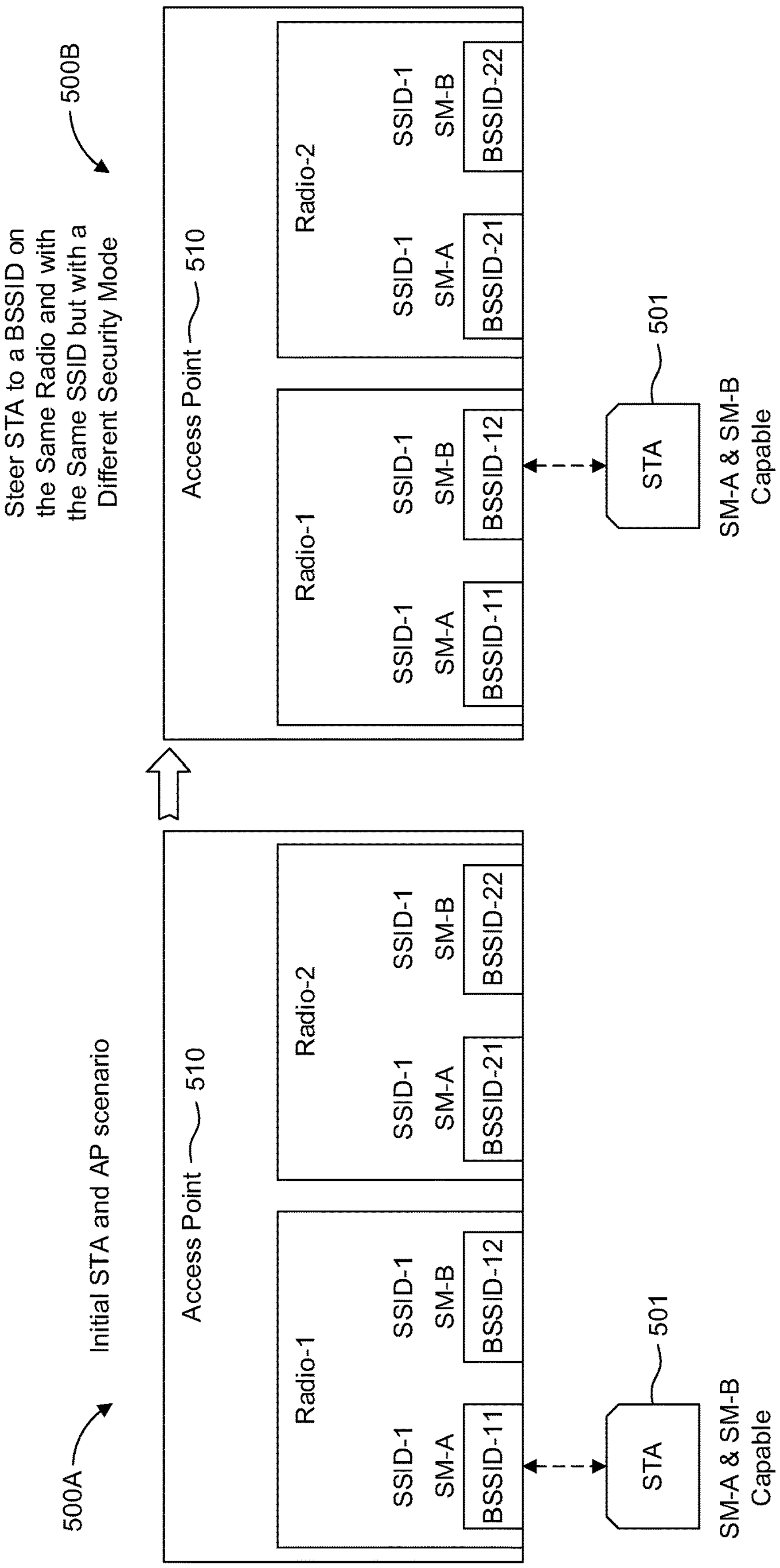
FIG. 5 illustrates an example of steering a STA to a BSSID on the same radio with the same SSID but with a different security mode.

FIG. 5 illustrates an example of steering a STA to a BSSID on the same radio with the same SSID but with a different security mode. The STA and AP scenario of FIG. 5 is similar to the example of FIG. 4. As shown, the STA 502 may have the password for the network (SSID-1) and may connect to any wireless interface on any radio of the AP 510. The AP 510 has two radios (Radio-1 and Radio-2). At 500A, the STA 501 connects to BSSID-11 with security mode SM-A. SM-B may be a more secure security mode that is also supported by the STA 501, and it would be better from a security perspective if the STA was connected to BSSID-12 using SM-B. Consequently, at 500B STA 501 may be steered to BSSID-12 which uses SM-B.

Generally, there may be a process for a STA to connect to a network (e.g., at 500A, STA 501 would connect to BSSID-11 of AP 510), also called an association procedure, which may be further described herein. During the association, the STA and the AP may exchange capability information, such as, but not limited to, security capabilities, IEEE 802.11 protocol capabilities, transmit power capabilities, frequency, and/or bandwidth capabilities. In some instances, the STA may exchange capability information after has been associated with an AP. A client connection manager running on the AP may receive an indication of the security capabilities during the association procedure of the STA to the network/AP.

In some cases, if the AP merely hides a non-preferred interface during or prior to an association, a STA may continue to try and connect to that interface even though it is not preferred, resulting in a failed association, delay in connection, etc. Hence, a steering action by a client connection manager may be necessary to achieve the desired security mode for a STA at a given interface.

Referring again to FIG. 5, it may be assumed that a client connection manager running on AP 510 received an indication of the security capabilities of the STA 501 (e.g., during the association procedure of the STA to the network/AP, or after the STA is connected).

The client connection manager running on AP 510 may determine if STA 501 has established a connection with a BSSID that is not optimal for the STA from a security perspective; explained a different way, the client connection manager (e.g., AP 510) may determine, based on the STA 501 security capability information, that the STA 501 has established a connection with the network using a security mode other than a configured/preferred/optimal security mode available for both AP 510 and STA 501. The client connection manager running on AP 510 may identify a preferred/best BSSID for the STA (e.g., according to a configured preference). At 500B, the connection manager running on AP 510 may steer STA 501 to BSSID-12, which has a preferred security mode.

Figure 10:
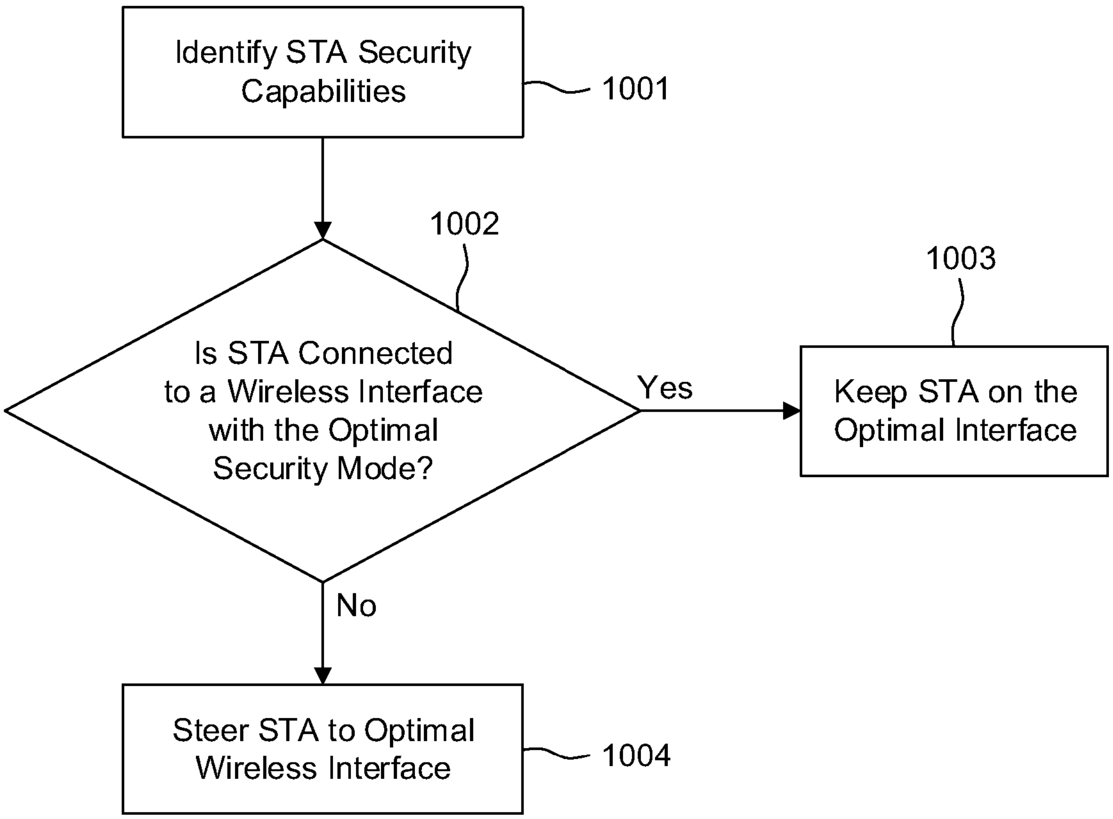
FIG. 10 illustrates an example process flow of a client connection manager running on an AP.

FIG. 10 illustrates an example process flow of a client connection manager running on an AP. FIG. 10 may provide an example process that encompasses the scenario as shown in the example of FIG. 5. At 1001, the client connection manager running on a first AP identifies a STA's security capabilities. The AP may receive this information in a message from a STA or another AP. The AP may receive this information during an association procedure with the STA. At 1002, the client connection manager running on the first AP determines whether the STA is connected to a wireless interface (e.g., a BSSID) that is preferred according to a configuration (e.g., optimal, most secure, user preference, service provider preferences, etc.). The STA may be connected to the first AP or another AP. At 1003, if the STA is on a preferred wireless interface, then no further steering action is required. This may be reevaluated periodically by the client connection manager running on the first AP at a configured interval or based on an event related to the STA (e.g., reconnects, moves to a different AP, etc.). At 1004, if the STA is not on a preferred wireless interface, then the client connection manager running on the first AP steers the STA to a preferred interface, assuming one is available (e.g., in some instances, it may be determined that an interface is unavailable for medium usage balancing, AP availability, etc.). The steering process may be further discussed herein (e.g., FIG. 11).

Generally, an AP may steer a STA to another interface (e.g., of the same AP or a different AP) in a wireless network using a steering procedure. A client connection manager running on the AP may utilize a BSS Transition Request Message (of the IEEE 802.11v standard) to steer the STA to a preferred BSSID. For that, the client connection manager running on the AP may send a BSS Transition Request message to the STA. The client connection manager may determine which specific parameters should be used in the BSS Transition Management Request Message.

The client connect manager may track if the STA is still connected to a suboptimal BSSID (e.g., suboptimal in the meaning that the STA is not connected to the preferred and/or most secure wireless interface that it can connect to). If the STA is found to be still not connected to the preferred/optimal BSSID, the client connection manager may retrigger sending of the BSS Transition Request Message. The client connection manager may continuously monitor who (e.g., what STA, using a STA identifier) is connected to where (e.g., AP). The client connection manager may identify if a known STA is connected to a preferred/non-preferred STA at any time. The client connection manager may log historic data (e.g., timestamps indicating time of the action/monitoring) regarding connections and steering actions. This logged data may enable the client connection manager(s), or a controller of the wireless network, to perform analysis and better manage the security mode being utilized between a STA and an AP interface.

If the STA does not roam to the designated BSSID after a predetermined number of steering attempts (e.g., sending of BSS Transition Request Messages), then the client connection manager may conclude that the STA will not roam, and as a result it may stop trying to steer the STA (e.g., indefinitely or for a period of time). When the client connection manager stops steering attempts, it may also unhide any previously hidden SSIDs.

If the STA roams to the designated BSSID, the steering operation may be concluded successfully. Once the STA is connected to the designated BSSID, SSIDs that were hidden due to the steering process may be unhidden.

Figure 11:
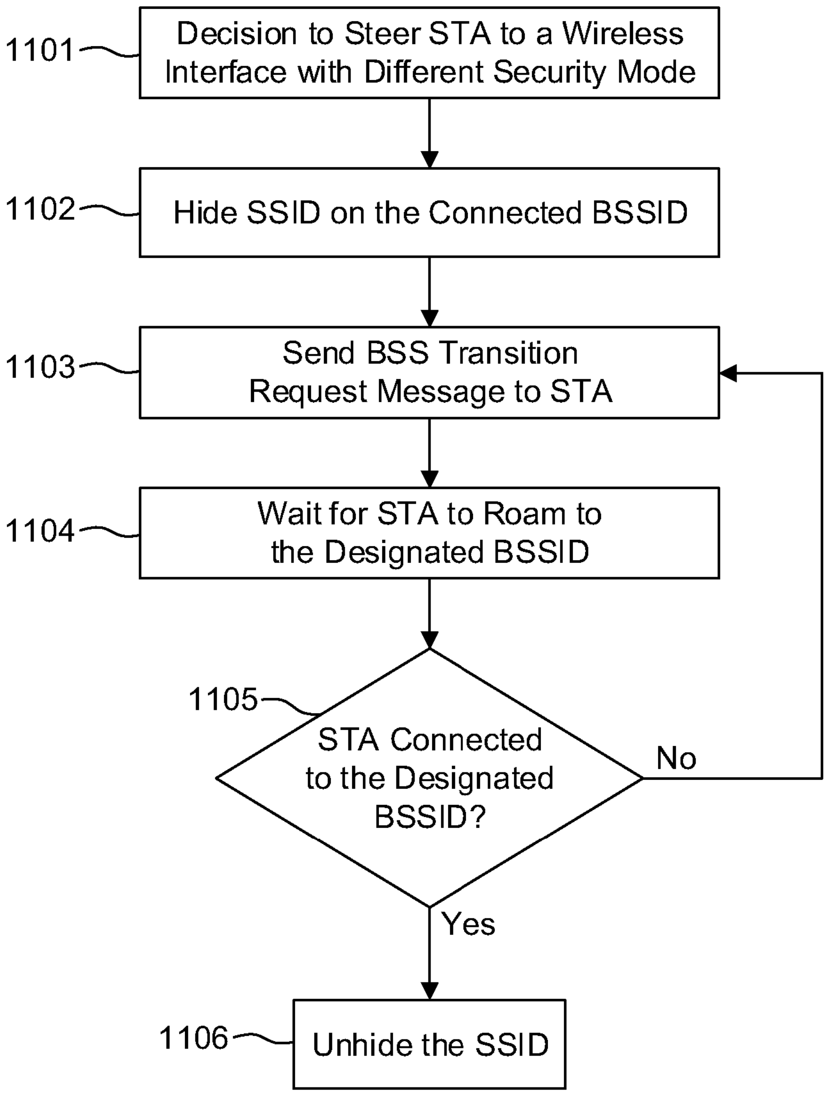
FIG. 11 illustrates an example process flow of a client connection manager running on an AP steering a STA.

FIG. 11 illustrates an example process flow of a client connection manager running on an AP steering a STA. In some cases, the client connection manager may follow a process to steer the STA to a preferred BSSID after it is determined that the STA is not at a preferred BSSID. At 1101, a client connection manager running a first AP may decide to steer a STA to a wireless interface with a different security mode (e.g., the process of FIG. 10). At 1102, the client connection manager running on the first AP may hide the SSID from the STA on the connected BSSID. At 1103, the client connection manager running on the first AP may send a BSS transition request message to the STA. At 1104, in some instances, the client connection manager running on the first AP may wait for a configured period of time for the STA to roam wireless interfaces. At 1105, the client connection manager running on the first AP determines that the STA has roamed to the preferred BSSID. If the client connection manager running on the first AP determines that the connection to the preferred BSSID is unsuccessful, then the client connection manager running on the first AP may repeat one or more steps in the process (e.g., sending the BSS transition request message). At 1106, once the STA is at the preferred BSSID, the client connection manager running on the first AP unhides the SSID.

In some cases, a steering process (e.g., FIG. 11) may be triggered based on one or more factors and/or events (e.g., determining a STA is not connected to a preferred interface, STA mobility, STA association, update on preference information, update from STA, update from controller, update from another client connection manager, etc.).

While the examples of FIGS. 10 and 11 relate to each other, the AP that performs each process may be the same or may be different despite both examples referencing a "first AP".

In some cases, a client connection manager running on an AP may not employ "Hide SSID on the connected BSSID" step of the example in FIG. 11; specifically, the client connection manager running on the AP may not hide the SSID on the connected BSSID (e.g., after it is determined a STA is not using a preferred interface/BSSID). Hiding the SSID on a BSSID means that the SSID field in the beacon frame (e.g., illustrated in FIG. 9) may indicate no SSID (e.g., it is not filled in, the field is empty, a value is used that indicates hiding the SSID). When the SSID is not hidden, the SSID field in the beacon frame may be filled with the actual SSID of the wireless interface.

Figure 12:
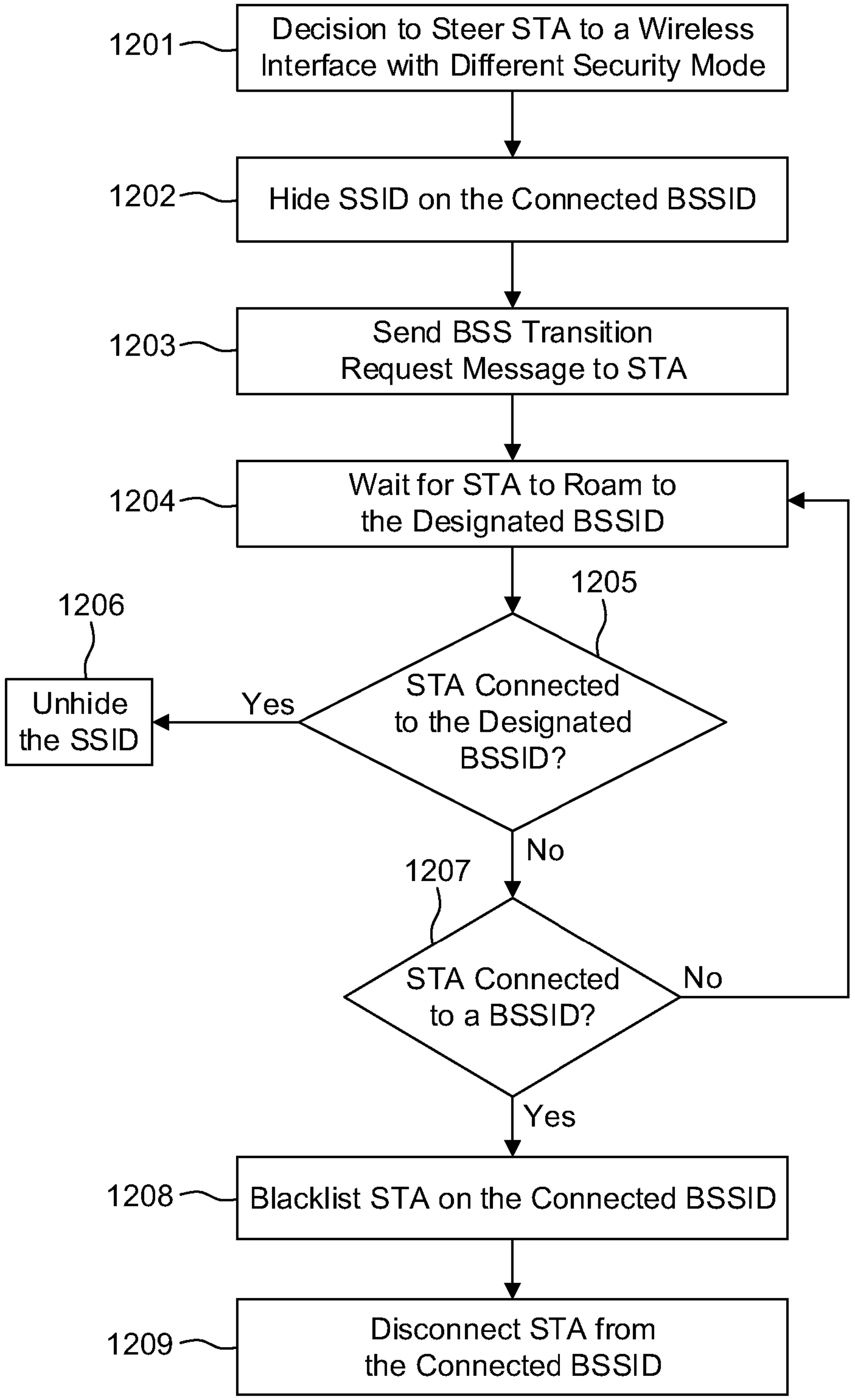
FIG. 12 illustrates an example process flow of a forceful steering procedure.

FIG. 12 illustrates an example process flow of a forceful steering procedure. In one case, the client connection manager may employ a forceful steering mechanism. FIG. 12 may be similar to FIG. 11, where 1101-1106 may correspond to 1201-1206. However, in FIG. 12, the STA may not connect to the designated BSSID, and may be connected to a non-designated BSSID. Specifically, at 1207 if the STA is found to be not establishing a connection to the designated BSSID, then at 1208 the client connection manager may blacklist the STA on the connected wireless interface (BSSID), and then at 1209 disconnect the STA. Generally, the AP may have knowledge of all BSSIDs on it. Each AP (e.g., client connection manager and/or a controller of a wireless network) may collect/receive information regarding all other APs within a wireless network.

Generally, blacklisting a STA on a wireless interface means that the STA is not permitted to associate with the interface when the STA requests to associate (e.g., the AP refuses the association request). Disconnecting a STA means that the AP that the STA is connected to sends a deauthentication frame and/or a disassociate frame to the STA.

Figure 6:
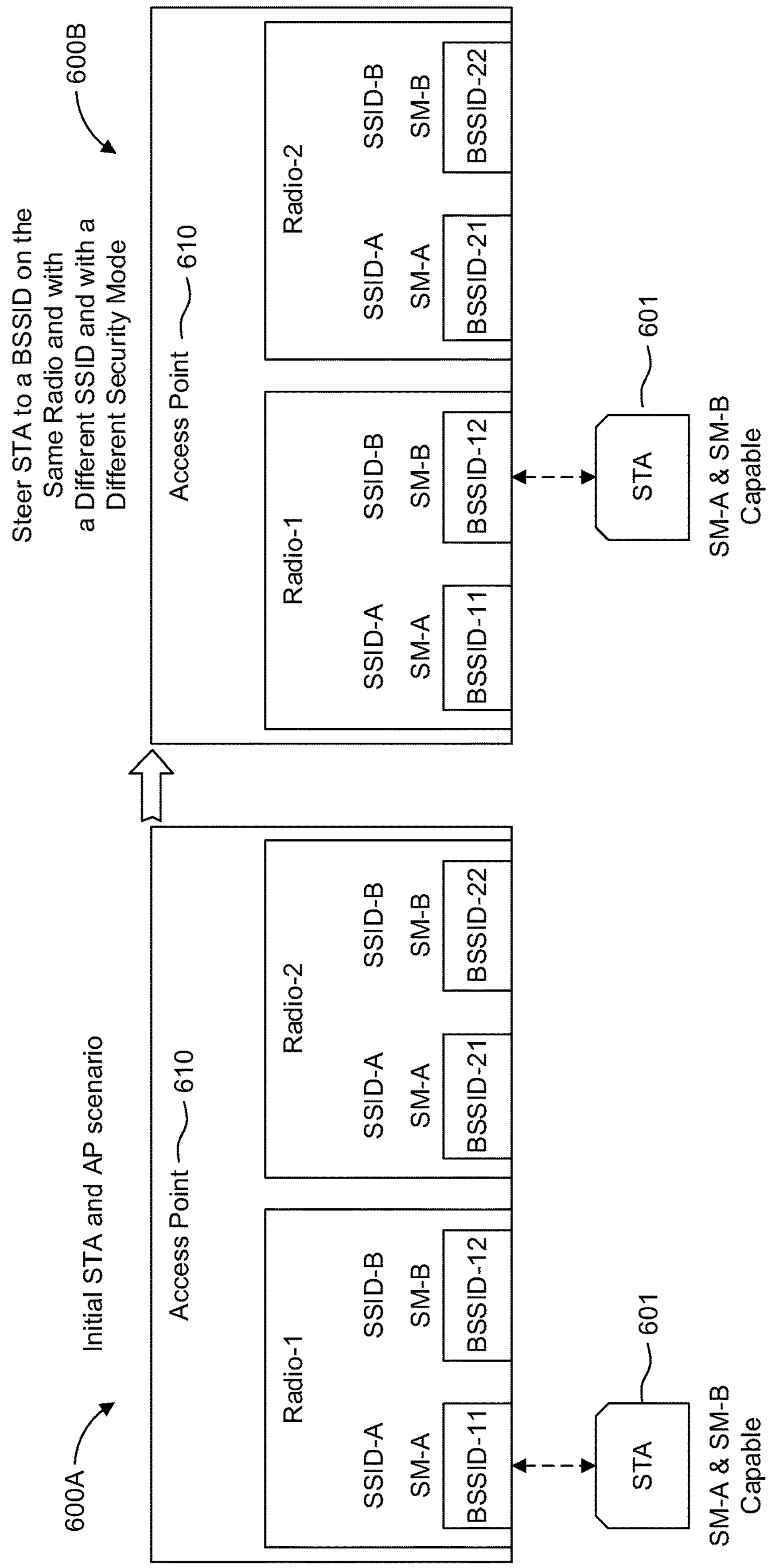
FIG. 6 illustrates an embodiment where the STA is steered to a BSSID on the same radio and that has a different SSID with a different security mode.

FIG. 6 illustrates an embodiment where the STA is steered to a BSSID on the same radio and that has a different SSID with a different security mode. Initially, at 600A, there may be an AP 610 with two radios (Radio-1 and Radio 2), where each radio has two interfaces (BSSID-11 and BSSID-12;

and, BSSID 21 and BSSID 22, respectively). Each BSSID may have a different security mode (SM-A and SM-B) and a different SSID (SSID-A and SSID-B). STA 601 may have the credentials for both SSID-A and SSID-B. The AP 610 may be running a client connection manager. STA 601 may be connected to AP 610 at interface BSSID-11 using SM-A on SSID-A. The AP 610 may know that STA 601 is SM-A and SM-B capable (e.g., determined during an association procedure or some other message exchange). At 600B, AP 610 (e.g., running a client connection manager) may determine to and steer STA 601 to interface BSSID-12 that uses SM-B of SSID-B (e.g., according to one or more steering techniques disclosed herein). The determination may be based on a configured preference, such as SM-B being a better security mode than SM-A.

Figure 7:
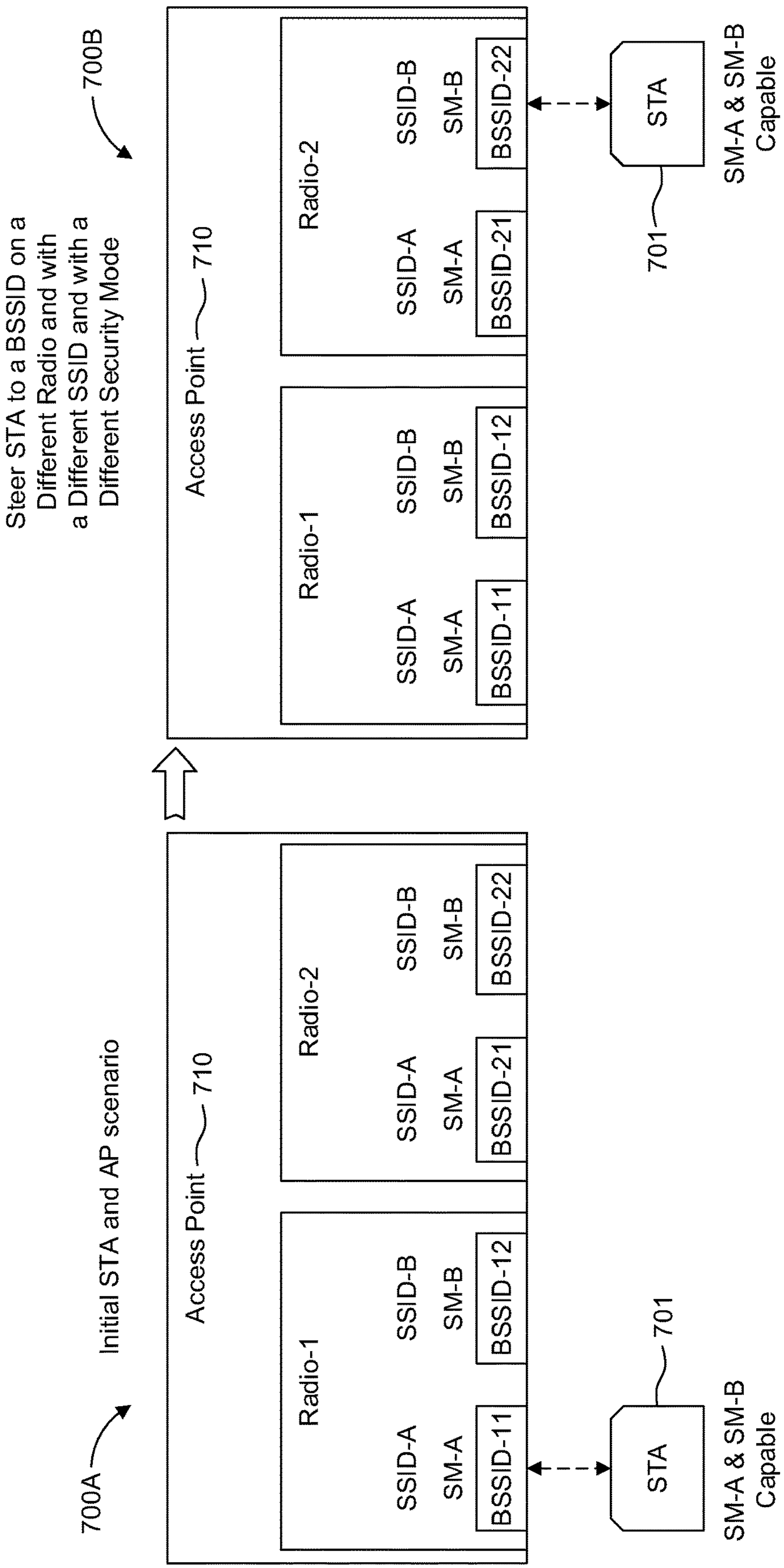
FIG. 7 illustrates an embodiment where the STA is steered to a BSSID on a different radio and that has a different SSID with a different security mode.

FIG. 7 illustrates an embodiment where the STA is steered to a BSSID on a different radio and that has a different SSID with a different security mode.

Initially, at 700A, there may be an AP 710 with two radios (Radio-1 and Radio 2), where each radio has two interfaces (BSSID-11 and BSSID-12; and, BSSID 21 and BSSID 22, respectively). Each BSSID may have a different security mode (SM-A and SM-B) and a different SSID (SSID-A and SSID-B). STA 701 may have the credentials for both SSID-A and SSID-B. The AP 710 may be running a client connection manager. STA 701 may be connected to AP 710 at interface BSSID-11 using SM-A on SSID-A. The AP 710 may know that STA 701 is SM-A and SM-B capable (e.g., determined during an association procedure or some other message exchange). At 700B, AP 710 (e.g., running a client connection manager) may determine to steer STA 701 to interface BSSID-22 that uses SM-B of SSID-B (e.g., according to one or more steering techniques disclosed herein). The determination may be based on a configured preference, such as SM-B being a better security mode than SM-A.

Figure 8:
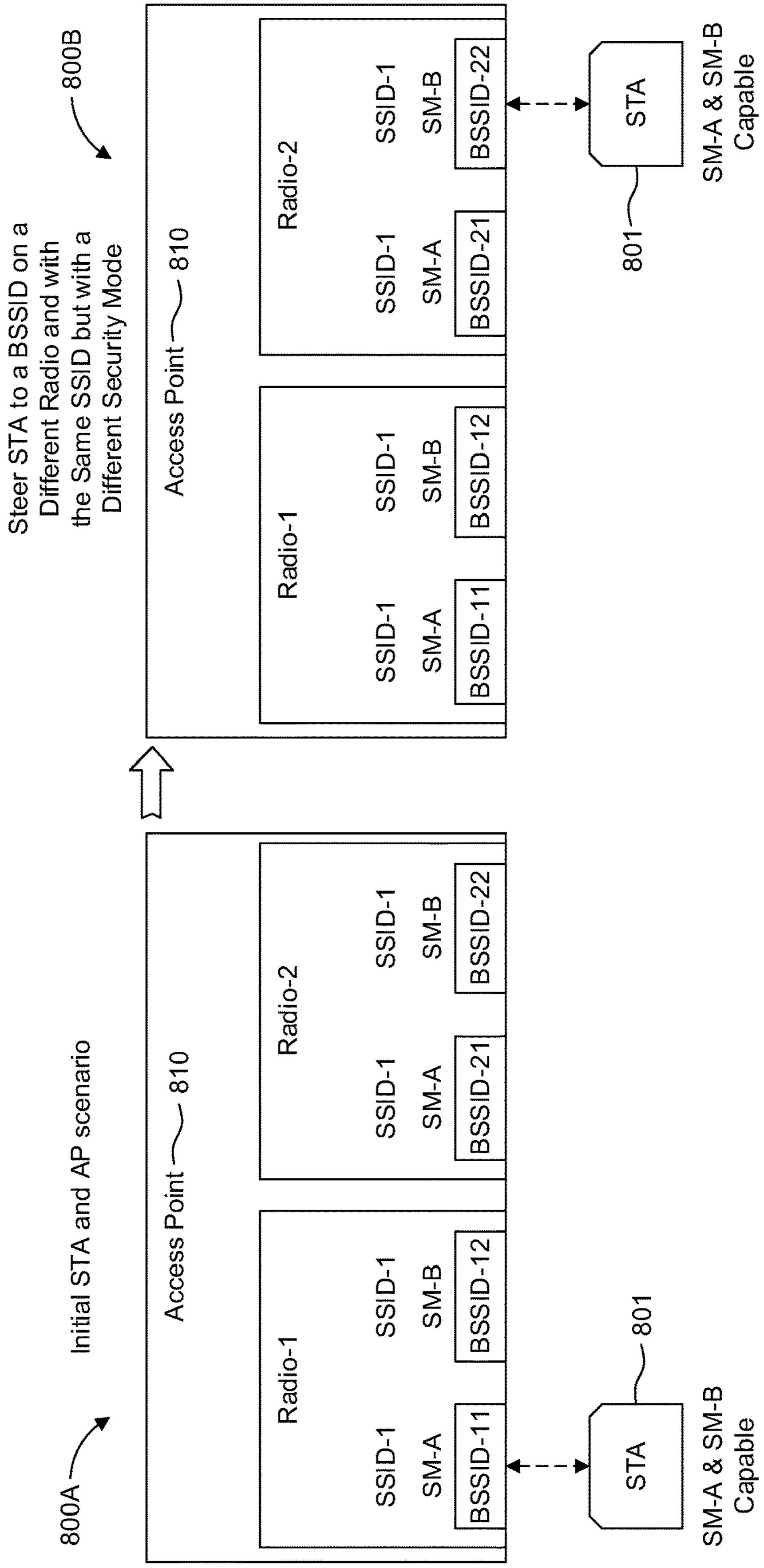
FIG. 8 illustrates an embodiment where the STA is steered to a BSSID on a different radio and that has the same SSID with a different security mode.

FIG. 8 illustrates an embodiment where the STA is steered to a BSSID on a different radio and that has the same SSID with a different security mode.

Initially, at 800A, there may be an AP 810 with two radios (Radio-1 and Radio 2), where each radio has two interfaces (BSSID-11 and BSSID-12; and, BSSID 21 and BSSID 22, respectively). Each BSSID may have a different security mode (SM-A and SM-B) and the same SSID (SSID-1). STA 801 may have the credentials for SSID-1. The AP 810 may be running a client connection manager. STA 801 may be connected to AP 810 at interface BSSID-11 using SM-A on SSID-1. The AP 810 may know that STA 801 is SM-A and SM-B capable (e.g., determined during an association procedure or some other message exchange). At 800B, AP 810 (e.g., running a client connection manager) may determine to and steer STA 801 to interface BSSID-22 that uses SM-B of SSID-1 (e.g., according to one or more steering techniques disclosed herein). The determination may be based on a configured preference, such as SM-B being a better security mode than SM-A.

In some cases, the processes of FIG. 10 and/or FIG. 11 may be applicable to the scenarios of FIG. 6, FIG. 7, and/or FIG. 8. For example, for FIG. 6, a client connection manager may determine that BSSID-11 is not optimal for STA-601 and may steer STA 601 to BSSID-12. The client connection manager may do this because SM-B is preferred over SM-A. In some instances, other factors may also be considered, such as that BSSID-12 maintained use of Radio 1, that the SSID-B was different for BSSID-12, and/or other factors related to the specific use case as presented in FIG. 6. In an example that references FIG. 7, a client connection manager may determine that BSSID-11 is not optimal for STA-701 and may steer STA 701 to BSSID-22. The client connection manager may do this because SM-B is preferred over SM-A. In some instances, other factors may also be considered, such as that BSSID-22 used a different radio, that the SSID-B was different for BSSID-22, and/or other factors related to the specific use case as presented in FIG. 7. In an example that references FIG. 8, a client connection manager may determine that BSSID-11 is not optimal for STA-801 and may steer STA 801 to BSSID-22. The client connection manager may do this because SM-B is preferred over SM-A. In some instances, other factors may also be considered, such as that BSSID-22 used a different radio, that the SSID-1 was the same for BSSID-22, and/or other factors related to the specific use case as presented in FIG. 8.

In some cases, configuration of a preferred security mode(s) may include an association between one or more parameters of a given use case. For example, in a use case where there are two different radios, each associated with a security mode, then a configured preference for one security mode over another may have a security mode specifically tied to a Radio spectrum (e.g., configuration indicates that Radio 1 is operating on 2.4 GHz and supports WPA 2, and Radio 2 is operating on 6 GHz and supports WPA 3).

In some cases, the client connection manager may steer the STA from a BSSID on one AP to a BSSID on another AP in the network.

In some cases, a client connection manager may have a connection to a computer program running in a cloud-server where the client connection manager may get information and/or instructions related to capability information (e.g., capability of other APs, STAs in the network, etc.), steering behavior information, and/or steering parameter information related to a STA, such as but not limited to parameters of the BSS Transition Request Management message (e.g., disassociation imminent, disassociation timer, etc.). The client connection manager may get this information from the cloud in an unsolicited fashion (meaning that the program running in the cloud provides and/or pushes the information to the client connection manager without an explicit request dynamically and/or periodically), or in response to a request.

In some cases, the client connection manager may be enabled or disabled remotely through the cloud. Furthermore, the client connection manager may be programmed through the cloud to steer only designated STAs. The information related to the designated STAs may be delivered to the client connection manager in a form of list of STA unique identifiers, in a form of list of STA MAC addresses, in a form of a range of MAC addresses, in a form of Organizationally Unique Identifiers (OUIs), in a form of type of STAs, in a form of vendor names, in a form of Wi-Fi protocols (IEEE 802.11 protocols) supported by the STAs, and/or in a form of types of security protocols supported by the STAs.

The client connection manager may be programmed through the cloud to update the list of preferred security modes per client. Client steering actions of the client connection manager may be triggered by another client connection manager running in the cloud. The client steering rules, policies, preferences per client used by the client connection manager may be updated through cloud.

The client connection manager may be co-located with a wireless mesh controller (e.g., a Wi-Fi Alliance (WFA) EasyMesh™ Controller). In such a case, the client connection manager may directly instruct the EasyMesh Controller, instead of the wireless driver, (e.g., for the instructions related to steering a STA by sending BSS Transition Management Request message or sending a de-authentication frame) for steering of a STA.

The client connection manager may communicate with a WFA EasyMesh™ Controller and WFA EasyMesh™ Agent for data collection (such as but not limited to data related to security modes supported by the client, security modes supported by each wireless interface of an AP, 802.11 protocols supported by the client and the APs in the network), and for management of the client connection.

The client connection manager may collect diagnostic data related to clients (STAs), such as but not limited to steering success statistics per client, clients' preferred security modes (e.g., what security mode a client prefers to use), client connection durations on each security mode, client disconnect statistics per security mode, and/or client download/upload statistics per security mode. The client connection manager may get all or a part of this information from another program/daemon running on the APs, such as the WFA EasyMesh Controller.

The client connection manager may send the collected diagnostic data to a cloud-server directly, or it may send the data through another program residing on the same device, for example, a cloud-communicator program that collects data from one or more programs running on the network and that sends all collected data to a cloud-server.

Although features and elements are described above in particular combinations (e.g., embodiments, methods, examples, etc.), one of ordinary skill in the art will appreciate that each feature or element can be used alone or in any combination with the other features and elements. For example, as disclosed herein there may be a method described in association with a figure for illustrative purposes, and one of ordinary skill in the art will appreciate that one or more features or elements from this method may be used alone or in combination with one or more features from another method described elsewhere.

Although one or more figures included herein are described in a series of steps, it is intended that each step, and/or element, may be optional, reordered, or combined with one or more other steps/elements from a different figure. For example, in FIG. 11, during a steering procedure an SSID may not be hidden.

In addition, the methods described herein may be implemented in a device running a computer program, software, and/or firmware incorporated in a computer-readable medium for execution by a computer and/or processor operatively connected with a transceiver (e.g., wireless or wired) of the device. Examples of computer-readable media include electronic signals (transmitted over wired or wireless connections) and computer-readable storage media. Examples of computer-readable storage media include, but are not limited to, read-only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a device, station, terminal, base station, access point, network, gateway, controller, or any computer.

What is claimed is:

1. An 802.11 Wi-Fi access point (AP) comprising:

a memory;

a processor operatively coupled to the memory, the processor configured to run a client connection manager on the 802.11 Wi-Fi AP; and a baseband processor operatively connected to the processor, the baseband processor configured to operate a plurality of basic service sets (BSSs), each BSS associated with a respective BSS identifier (BSSID) and an associated security mode, wherein a preferred security mode is Wi-Fi Protected Access (WPA), WPA2, or WPA3; and wherein the client connection manager steers a station (STA) associated with a BSSID of the plurality of BSSIDs to a second BSSID of the plurality of BSSIDs based on determining that the second BSSID uses the preferred security mode and that capability information of the STA indicates that the STA is capable of the preferred security mode, wherein steering includes transmitting a BSS transition management message to the STA, and wherein the preferred security mode is stronger than a security mode that the STA is using prior to being steered.

2. The 802.11 Wi-Fi AP of claim 1, wherein the AP is collocated with a gateway.

3. The 802.11 Wi-Fi AP of claim 1, wherein the client connection manager receives the capability information from the STA during an association procedure.

4. The 802.11 Wi-Fi AP of claim 1, where the client connection manager received the capability information from another connection manager, a cloud, or a mesh controller.

5. The 802.11 Wi-Fi AP of claim 1, wherein the preferred security mode is WPA3 and the security mode of the STA is WPA2 or WPA, or the preferred security mode is WPA3 or WPA2 and the security mode of the STA is or WPA.

6. A method implemented by a connection manager running on an 802.11 Wi-Fi Access Point (AP), the method comprising:

steering a station (STA) associated with a first BSS identifier (BSSID) of a plurality of BSSIDs to a second BSSID of the plurality of BSSIDs based on determining that the second BSSID uses a preferred security mode and that capability information of the STA indicates that the STA is capable of the preferred security mode, wherein the preferred security mode is Wi-Fi Protected Access (WPA), WPA2, or WPA3, wherein steering includes transmitting a BSS transition management message to the STA, and wherein the preferred security mode is stronger than a security mode that the STA is using prior to being steered.

7. The method of claim 6, wherein the AP is collocated with a gateway.

8. The method of claim 6, further comprising receiving the capability information from the STA during an association procedure.

9. The method of claim 6, wherein the capability information is received from another connection manager, a cloud, or a mesh controller.

10. The method of claim 6, wherein the preferred security mode is WPA3 and the security mode of the STA is WPA2 or WPA, or the preferred security mode is WPA3 or WPA2 and the security mode of the STA is or WPA.

* * * * *